J. McAULIFFE.
Method of Softening Umbrella-Ribs.
No. 160,110 — Patented Feb. 23, 1875.
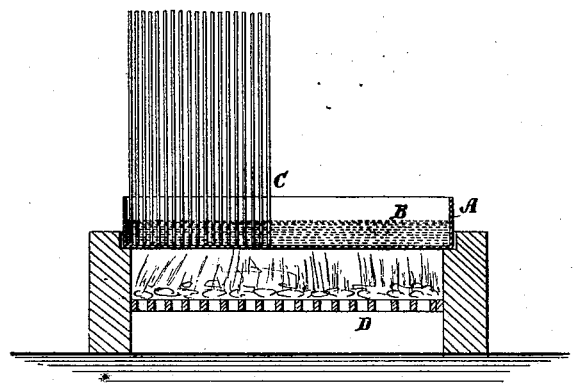
WITNESSES:
A. Bennerkendorf
A. F. Terry
INVENTOR:
John McAuliffe
BY
ATTORNEYS.
THE GRAPHIC CO. PHOTO-LITH. 39 & 41 PARK PLACE, N.Y.

UNITED STATES PATENT OFFICE.

JOHN McAULIFFE, OF NEW YORK, N. Y.

IMPROVEMENT IN METHODS OF SOFTENING UMBRELLA-RIBS.

Specification forming part of Letters Patent No. 160,110, dated February 23, 1875; application filed December 28, 1874.

*To all whom it may concern:*

Be it known that I, JOHN MCAULIFFE, of New York city, in the county and State of New York, have invented a new and Improved Method of Softening Umbrella-Ribs, of which the following is a specification:

My improvement relates to the softening of the ends of umbrella-ribs to facilitate the boring or punching of the holes for the wire by which they are fastened to the collars; and it consists in standing the ribs in a bath of hot lead, or otherwise exposing so much of the length as is to be softened to heat, while the remaining portion is not exposed sufficiently to have the temper drawn, and letting them stand while the bath or other medium for heating them is cooled down gradually to atmospheric temperature, or thereabout.

These ribs are hardened by the manufacturer to give them the necessary spring-temper while in the long pieces in which they are originally made. The umbrella-maker cuts them in suitable lengths for ribs, flattens the ends, and punches the holes, first heating a short portion of the end to soften the metal, so that it will hammer down readily, and particularly to facilitate the punching; but, owing to the small size of the wire and proportionately great surface exposure to air, the ribs cannot be thoroughly softened by heating them in the fire and then drawing them out into the air, for they chill and harden in the air so as to be very difficult to punch, particularly the very small holes such as are suitable for the small wire used. Therefore I have contrived to cool the wires off gradually in the heat-bath, so as to effectually prevent any chill by a sudden change from a hot to a cold atmosphere.

In carrying out my invention I take a large pan, fill it with lead to the height it is desired to heat the ribs, and thus stand it full of ribs when sufficiently hot to draw the temperatures, and then let the bath and the ribs standing in it cool off together. To release the ribs from sticking fast in the cold lead, I make a little heat under the pan, which soon releases the ribs when I wish to take them out.

The same method can be carried out by using a hot oven with perforated walls of non-conducting material and arranging the ribs in the perforations so as to project into the oven enough to be heated as far above the ends as needed. The oven may be heated by gas or any equivalent means which will allow of gradually shutting it off. I propose to use either of these methods.

In the drawing 1 have represented a lead-bath in sectional elevation, with a quantity of ribs in it being treated according to my invention.

A is the pan. B is the lead. C is the ribs, and D the fire-place.

In the practical application of this invention I find it a good plan to heat up the bath with the wires in it at night and let it stand till morning for cooling. As many ribs as will stand in the pan side by side, or nearly so, may be treated in one batch, so that the process will be quite as expeditious as any.

I am aware that lead-baths have been heretofore used in tempering steel; but

What I claim is—

The process of softening umbrella-ribs of tempered steel preparatory to punching holes therein by standing the ends that are to be punched in molten lead brought to a red heat, then allowing both lead and rib ends to cool off together, and finally separating the surrounding lead from the ribs by a gentle heat, all substantially as set forth.

JOHN McAULIFFE.

Witnesses:
T. B. MOSHER,
ALEX. F. ROBERTS.